US 008185943B1

(12) United States Patent
Jagger et al.

(10) Patent No.: US 8,185,943 B1
(45) Date of Patent: May 22, 2012

(54) NETWORK ADAPTER FIREWALL SYSTEM AND METHOD

(75) Inventors: Luke D. Jagger, Aylesbury (GB); Anton C. Rothwell, Aylesbury (GB); William R. Dennis, Aylesbury (GB)

(73) Assignee: McAfee, Inc., Santa Clara, CA (US)

(*) Notice: Subject to any disclaimer, the term of this patent is extended or adjusted under 35 U.S.C. 154(b) by 1659 days.

(21) Appl. No.: 10/028,652

(22) Filed: Dec. 20, 2001

(51) Int. Cl.
*H04L 29/06* (2006.01)
(52) U.S. Cl. .......................................... 726/11; 726/22
(58) Field of Classification Search .................. 713/201; 726/11, 22
See application file for complete search history.

(56) References Cited

U.S. PATENT DOCUMENTS

| | | | |
|---|---|---|---|
| 5,440,690 A | 8/1995 | Rege et al. ............... 395/200.02 |
| 5,452,442 A | 9/1995 | Kephat ............................ 714/38 |
| 5,502,833 A * | 3/1996 | Byrn et al. ..................... 711/132 |
| 5,511,163 A | 4/1996 | Lerche et al. .................. 714/28 |
| 5,623,600 A | 4/1997 | Ji et al. .......................... 713/201 |
| 5,717,855 A * | 2/1998 | Norman et al. ............... 709/250 |
| 5,799,064 A | 8/1998 | Sridhar et al. |
| 5,802,277 A | 9/1998 | Cowland |
| 5,896,499 A | 4/1999 | McKelvey .................... 713/201 |
| 5,915,008 A * | 6/1999 | Dulman .................... 379/221.08 |
| 5,968,176 A | 10/1999 | Nessett et al. ................ 713/201 |
| 6,006,329 A | 12/1999 | Chi |
| 6,009,520 A | 12/1999 | Gharda |
| 6,075,863 A | 6/2000 | Krishnan et al. |
| 6,112,252 A * | 8/2000 | Hausman et al. ............. 709/250 |
| 6,119,165 A | 9/2000 | Li et al. ........................ 709/229 |
| 6,161,130 A | 12/2000 | Horvitz et al. |
| H1944 H * | 2/2001 | Cheswick et al. ............... 726/11 |
| 6,279,113 B1 | 8/2001 | Vaidya .......................... 713/201 |
| 6,298,444 B1 | 10/2001 | Foss et al. |
| 6,401,210 B1 | 6/2002 | Templeton ...................... 726/24 |
| 6,513,122 B1 | 1/2003 | Magdych et al. ............. 713/201 |
| 6,631,466 B1 * | 10/2003 | Chopra et al. ................. 712/300 |
| 6,658,562 B1 | 12/2003 | Bonomo et al. .................. 713/1 |
| 6,661,803 B1 * | 12/2003 | Choi et al. ..................... 370/413 |
| 6,683,869 B1 * | 1/2004 | Pierson, Jr. .................... 370/352 |
| 6,721,424 B1 | 4/2004 | Radatti |
| 6,772,347 B1 * | 8/2004 | Xie et al. ......................... 726/11 |
| 6,788,315 B1 * | 9/2004 | Kekic et al. ..................... 715/733 |
| 6,826,694 B1 * | 11/2004 | Dutta et al. ...................... 726/13 |

(Continued)

FOREIGN PATENT DOCUMENTS

WO 98/45778 10/1998

(Continued)

OTHER PUBLICATIONS

"How Firewalls Work," Nov. 10, 2000, pp. 1-7. <http://web.archive.org/web/http://howstuffworks.com/firewall.htm>.*

(Continued)

*Primary Examiner* — Michael Pyzocha
(74) *Attorney, Agent, or Firm* — Patent Capital Group (57) ABSTRACT

A network adapter system and associated method are provided. Included is a network adapter having a plurality of designated trusted and untrusted ports. The network adapter includes a processor coupled to a computer. Such processor is further coupled to a network via the ports. In use, the processor is configured for conditionally preventing network traffic from accessing the computer from the network via the untrusted ports and/or preventing unauthorized software from accessing the network in an untrusted manner from the computer.

14 Claims, 7 Drawing Sheets

U.S. PATENT DOCUMENTS

| | | | |
|---|---|---|---|
| 6,854,020 B1* | 2/2005 | Kamihara et al. | 710/1 |
| 6,910,134 B1 | 6/2005 | Maher et al. | 726/24 |
| 6,925,572 B1* | 8/2005 | Amit et al. | 726/15 |
| 6,981,265 B1* | 12/2005 | Rees et al. | 719/313 |
| 7,023,861 B2 | 4/2006 | Makinson et al. | |
| 7,107,617 B2 | 9/2006 | Hursey et al. | 726/22 |
| 7,143,438 B1* | 11/2006 | Coss et al. | 726/11 |
| 7,151,744 B2* | 12/2006 | Sarkinen et al. | 370/230 |
| 7,188,367 B1 | 3/2007 | Edwards et al. | 726/24 |
| 7,761,605 B1 | 7/2010 | Rothwell et al. | |
| 2001/0039624 A1 | 11/2001 | Kellum | |
| 2002/0004840 A1* | 1/2002 | Harumoto et al. | 709/231 |
| 2002/0016826 A1* | 2/2002 | Johansson et al. | 709/207 |
| 2002/0078190 A1 | 6/2002 | Ullmann | |
| 2002/0078377 A1* | 6/2002 | Chang et al. | 713/201 |
| 2002/0095512 A1* | 7/2002 | Rana et al. | 709/232 |
| 2002/0162026 A1 | 10/2002 | Neuman et al. | 713/201 |
| 2003/0018890 A1* | 1/2003 | Hale et al. | 713/156 |
| 2003/0051142 A1* | 3/2003 | Hidalgo et al. | 713/176 |
| 2003/0069973 A1* | 4/2003 | Ganesan et al. | 709/226 |
| 2003/0097585 A1* | 5/2003 | Girard | 713/200 |
| 2003/0101338 A1* | 5/2003 | Mullen et al. | 713/152 |
| 2003/0167410 A1 | 9/2003 | Rigstad et al. | 713/201 |
| 2004/0003284 A1 | 1/2004 | Campbell et al. | |
| 2005/0259678 A1 | 11/2005 | Gaur | |

FOREIGN PATENT DOCUMENTS

| | | |
|---|---|---|
| WO | WO 98/45778 | 10/1998 |
| WO | 01/30036 | 4/2001 |

OTHER PUBLICATIONS

Answers.com, definition: solid state, p. 1.*
BIGfire User Manual, 1999, p. 14.*
"ConSeal PC Firewall Technical Information", May 2, 1999, pp. 1-2. <http://www.web.archive.org/web/19990502202255/signal9.com/technical/prodsummary/fwssummary.html>.*
Boran, Sean, "Personal Firewalls Tests: Consearl PC Firewall," Oct. 10, 2001, pp. 1-7.*
Ganger, Gregory et al., "Enabling Dynamic Security Management of Networked Systems via Device-Embedded Security," Dec. 2000, pp. 1-15.*
Payne, Charles et al., "Architecture and Applications for a Distributed Embedded Firewall," 17th Annual ACSAC Computer Security Applications Conference, Dec. 10-14, 2001, pp. 1-10.*
Office Action mailed Feb. 10, 2005 in U.S. Appl. No. 10/028,650.
Office Action mailed Jun. 30, 2005 in U.S. Appl. No. 10/028,650.
Office Action mailed Sep. 7, 2005 in U.S. Appl. No. 10/028,650.
3Com. 3Com Embedded Firewall Architecture for E-Business. Technical Brief 100969-001. 3Com Corporation, Apr. 2001.
3Com. Embedded Firewall for the 3Cr990 NICs Family. Software Solutions 600478-001. 3 Com Corporation, Aug. 2001.
Edwards, Mark. "Embedded Firewalls: The Next Wave?" WindowsIT Pro Apr. 18, 2001. Jan. 31, 2005. http://www.windowsitpro.com/Articles/Print.cfm?ArticleID=20703.
Advisory Action mailed Nov. 16, 2005 in U.S. Appl. No. 10/028,650.
Final Office Action Summary from U.S. Appl. No. 10/028,650 which was mailed on Apr. 9, 2007.
Office Action Summary from U.S. Appl. No. 10/028,650 mailed on Oct. 16, 2007.
Final Office Action Summary from U.S. Appl. No. 10/028,650 mailed on Mar. 25, 2008.
Office Action Summary from U.S. Appl. No. 10/028,650 mailed on Jan. 22, 2009.
VirusScan for Windows 95. User's Guide. McAfee. 1997. pp. 26, 47.
Office Action Summary from U.S. Appl. No. 10/028,650 mailed on Jul. 29, 2009.
Advisory Action Summary from U.S. Appl. No. 10/028,650 mailed on Jun. 25, 2007.
Office Action Summary from U.S. Appl. No. 10/028,650 mailed on Nov. 2, 2006.
Office Action Summary from U.S. Appl. No. 10/028,650 mailed on Jul. 28, 2008.
Notice of Allowance from U.S. Appl. No. 10/028,650 which was mailed on Jan. 28, 2010.
Response to Non-Final Office Action dated Feb. 10, 2005 in U.S. Appl. No. 10/028,650 filed on Mar. 30, 2005.
Response to Final Office Action dated Jun. 30, 2005 in U.S. Appl. No. 10/028,650 filed on Aug. 3, 2005.
Response to Final Office Action dated Sep. 7, 2005 in U.S. Appl. No. 10/028,650 filed on Oct. 13, 2005.
Notice of Appeal in U.S. Appl. No. 10/028,650 filed on Feb. 3, 2006.
Appeal Brief in U.S. Appl. No. 10/028,650 filed on Apr. 3, 2006.
Appeal Brief in U.S. Appl. No. 10/028,650 filed on Aug. 7, 2006.
Response to Non-Final Office Action dated Nov. 2, 2006 in U.S. Appl. No. 10/028,650 filed on Feb. 2, 2007.
Response to Final Office Action dated Apr. 9, 2007 in U.S. Appl. No. 10/028,650 filed on Jun. 11, 2007.
Request for Continued Examination and Amendment in U.S. Appl. No. 10/028,650 filed on Jul. 19, 2007.
Response to Non-Final Office Action dated Oct. 16, 2007 in U.S. Appl. No. 10/028,650 filed on Jan. 16, 2008.
Request for Continued Examination and Amendment in U.S. Appl. No. 10/028,650 filed on May 27, 2008.
Response to Non-Final Office Action dated Jul. 28, 2008 in U.S. Appl. No. 10/028,650 filed on Oct. 28, 2008.
Response to Non-Final Office Action dated Jan. 22, 2009 in U.S. Appl. No. 10/028,650 filed on May 22, 2009.
312 Amendment in U.S. Appl. No. 10/028,650 filed on Mar. 30, 2010.
Response to 312 Amendment in U.S. Appl. No. 10/028,650 mailed on Jun. 1, 2010.
Non-Final Office Action in U.S. Appl. No. 11/854,419 mailed on Aug. 15, 2008.
Response to Non-Final Office Action dated Aug. 15, 2008 in U.S. Appl. No. 11/854,419 filed on Nov. 17, 2008.
Final Office Action in U.S. Appl. No. 11/854,419 mailed on Feb. 27, 2009.
Notice of Appeal in U.S. Appl. No. 11/854,419 filed on Jun. 5, 2009.
Appeal Brief in U.S. Appl. No. 11/854,419 filed on Aug. 5, 2009.
Examiner's Answer to Appeal Brief in U.S. Appl. No. 11/854,419 mailed on Nov. 3, 2009.
Reply Brief in U.S. Appl. No. 11/854,419 filed on Jan. 4, 2010.

* cited by examiner

| Setting | Default value | Description |
|---|---|---|
| Trusted networks<br><br>*This setting would be omitted on the dual and multi-homed versions, as some ports would be trusted while the others would be untrusted.* | IP range:<br>192.168.1.1 – 192.168.255.254<br>Subnet:<br>255.255.255.0 | Default is to trust typical local addresses. All other networks (such as the Internet) would be untrusted by default. |
| TrustedSecurityLevel | LOW | Apply a relaxed level of security to trusted networks *see chart |
| UntrustedSecurityLevel | HIGH | Apply a high level of security to untrusted networks *see chart |
| AllowedPortsInboundUntrusted | NONE | Disallow connection to daemons on this machine from untrusted networks. |
| AllowedPortsInboundTrusted | ALL | Allow connection to daemons on this machine from trusted networks. |
| AllowedPortsOutbound | 25, 80, 8080, 110, 119 | Allow commonly used protocols such as SMTP, HTTP, HTTPS, POP3 and NNTP to be accessed from the machine. |

\* *Security levels may typically be:*

| | |
|---|---|
| HIGH | High security setting<br>Block incoming NETBIOS calls. ie. Windows file and print sharing.<br>Allow incoming TCP/IP and other protocols based on configuration.<br>Allow outbound communications based on configuration.<br>Hide local ports (stealth mode). |
| LOW | Relaxed security setting<br>Allow incoming NETBIOS calls.<br>Allow incoming TCP/IP and other protocols based on configuration.<br>Allow outbound communications based on configuration.<br>Don't hide local ports. |

NETWORK ADAPTER FIREWALL SYSTEM AND METHOD

FIELD OF THE INVENTION

The present invention relates to network adapters, and more particularly to interfacing with computers.

BACKGROUND OF THE INVENTION

In computer networks, a host computer system is normally connected to the network by a network adapter. In some designs, the network adapter is a board that plugs into the backplane bus of the host computer system. In other designs, the network adapter is built into the CPU motherboard. The host computer system typically includes a device driver which operates the network adapter.

Computer networks transfer data from one network node to another in the form of packets. For the purposes here, packets may include information for all layers of the ISO/OSI model at and above the data link layer. The network adapter transmits packets from the host computer system onto the network, and delivers packets from the network to the host computer system.

During operation, the host computer system produces two types of host memory buffers that are consumed by the network adapter: (1) transmit buffers containing packets to be transmitted onto the network, and (2) receive buffers to hold packets received from the network. The host computer system notifies the network adapter when either type of host memory buffer is produced. Similarly, the network adapter notifies the host computer system when it finishes consuming either type of buffer.

For example, to transmit a packet onto the network, the host computer system produces a transmit buffer by allocating a host memory buffer from a free pool of memory buffers, and writing the packet to the host memory buffer. The host computer system then notifies the network adapter that the transmit buffer has been produced (the packet is ready for transmission). The network adapter consumes the transmit buffer by transmitting the packet onto the network. The network adapter then notifies the host computer system that the buffer has been consumed (transmission has completed).

To receive a packet from the network, the host computer system first produces a receive buffer by allocating a host memory buffer into which a packet from the network may be received. The host computer system then notifies the network adapter that the receive buffer has been produced. When the network adapter subsequently receives a packet from the network to be stored in host memory, it consumes the receive buffer by writing the packet to it. The network adapter then notifies the host that the receive buffer has been consumed (the packet has been received).

When the host computer system is notified that a host memory buffer has been consumed (either a transmit buffer or a receive buffer), it completes the processing of that host memory buffer. The host computer system completes processing a consumed transmit buffer by returning the transmit buffer to the free pool of host memory buffers. The host computer system completes processing a consumed receive memory buffer by delivering the received packet to the appropriate user process, and then returning the receive buffer to the free pool of host memory buffers.

The host computer system typically notifies the network adapter after each host memory buffer has been produced by writing a register on the network adapter. The network adapter typically notifies the host computer system after each host memory buffer has been consumed by sending an interrupt to the host processor in the host computer system.

To date there has been no meaningful extension of the capabilities of network adapters to accomplish other tasks such as contributing to network security. Conventionally, the network adapter is often the ingress point for many untrusted packets of data, which may proliferate a virus on the associated computer. Unfortunately, such ingress point fails to provide any security features to prevent an attack on the computer.

DISCLOSURE OF THE INVENTION

A network adapter system and associated method are provided. Included is a network adapter having a plurality of designated trusted and untrusted ports. The network adapter includes a processor coupled to a computer. Such processor is further coupled to a network via the ports. In use, the processor is configured for conditionally preventing network traffic from accessing the computer from the network via the untrusted ports and/or preventing unauthorized software from accessing the network in an untrusted manner from the computer.

In one embodiment, the processor may be capable of being user-configured. As an option, the processor may be capable of being user-configured locally and/or remotely via a network connection with the network adapter. Further, the processor may be capable of being user-configured only after the verification of a password.

In another embodiment, the ports may include physical ports coupled to the network adapter for receiving plugs therein. Further, the trusted ports may be visually differentiated from the untrusted ports. This may or may not be accomplished utilizing color. In another embodiment, the ports may include electronic ports.

In still another embodiment, the processor may be capable of determining whether received packets are of interest. Further, this determination may be made based on an associated protocol.

In use, the processor may be capable of passing received packets that are not of interest. Further, the processor may be capable of checking whether the received packets violate predetermined rules if the received packets are of interest. As such, the processor may be capable of denying the received packets access to the computer if the received packets violate the predetermined rules.

DESCRIPTION OF THE PREFERRED EMBODIMENTS

Figure 1:
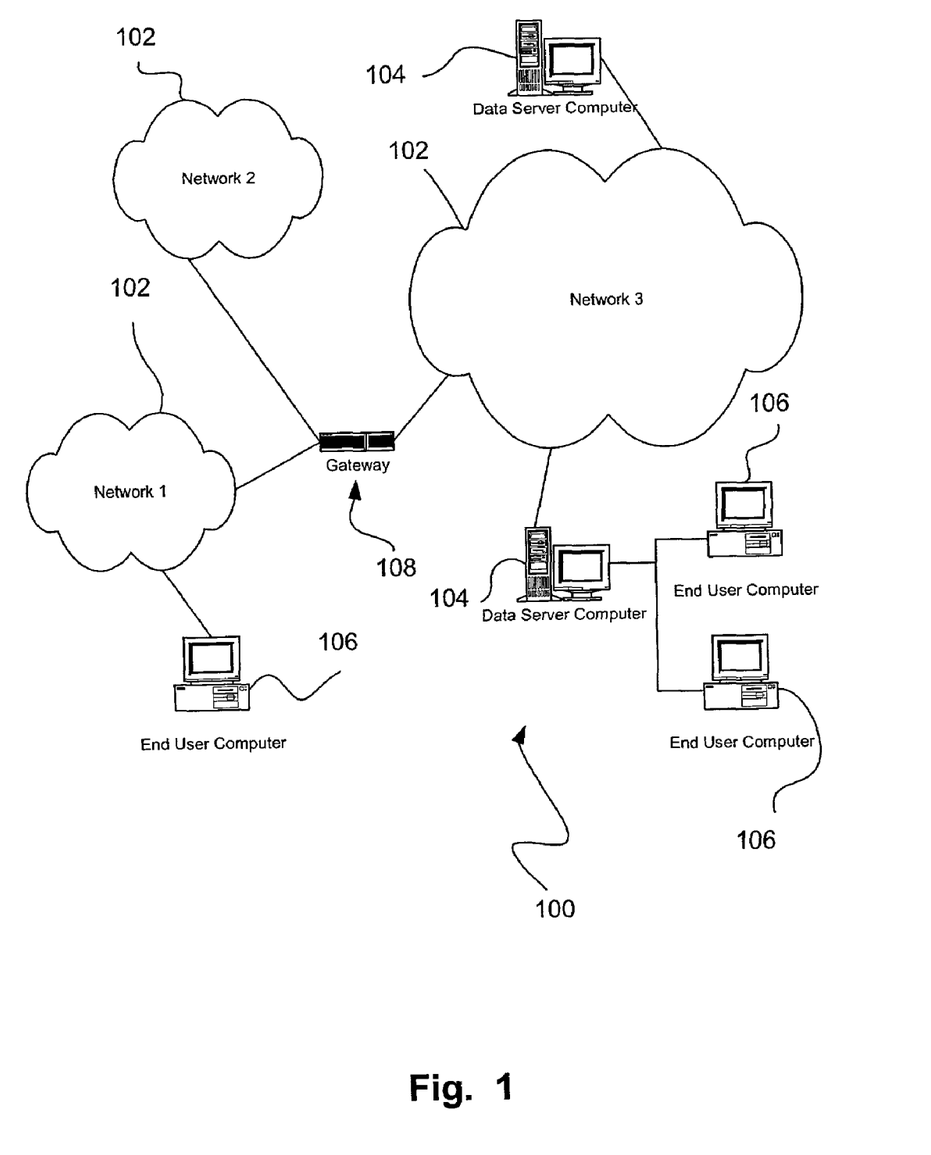
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, a computer may refer to any web server, desktop computer, lap-top computer, handheld computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Figure 2:
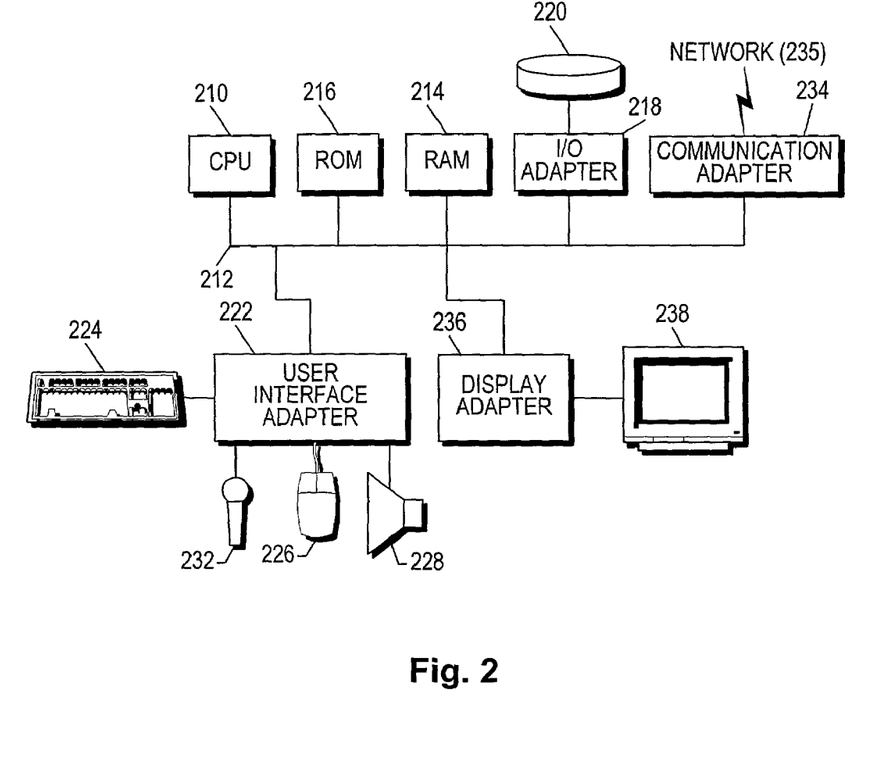
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3A:
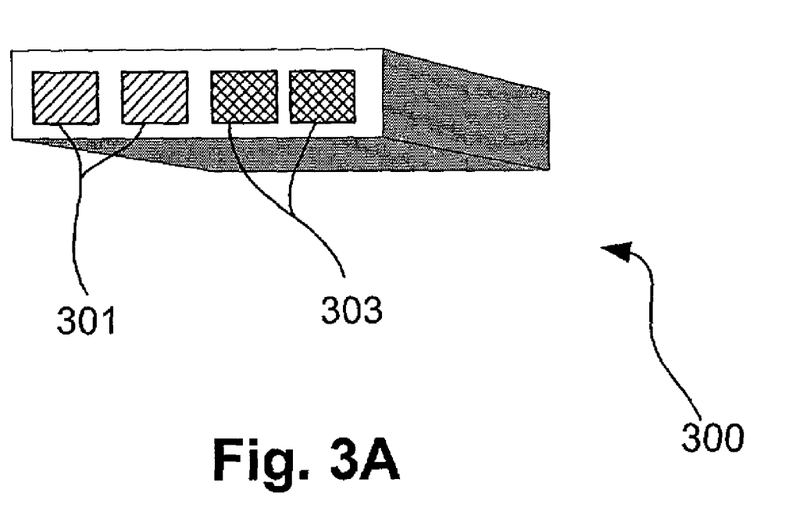
FIG. 3A illustrates an exemplary network adapter with firewall capabilities that may be coupled between a computer and a network like those shown in FIGS. 1 and 2.

FIG. 3A illustrates an exemplary network adapter 300 with firewall capabilities that may be coupled between a computer and a network like those shown in FIGS. 1 and 2. Of course, such network adapter 300 may be coupled between any computer and any network in any desired context.

As shown in FIG. 3A, the network adapter 300 is equipped with a plurality of mechanical ports for receiving jacks, plugs, etc. to effect an electro-mechanical connection with the network, accommodate wireless capabilities, etc. For reasons that will soon become apparent, the ports include trusted ports 301 for coupling to a network that is considered secure from which any type of network traffic (i.e. communications, data, etc.) may be received. The ports may also include untrusted ports 303 which are adapted for being coupled to untrusted networks that may require firewall functionality.

As an option, the trusted ports 301 may be visually differentiated from the untrusted ports 303. This may or may not be accomplished utilizing indicia (i.e. color), or any other differentiator. As such, a user may easily select whether the firewall capabilities of the network adapter 300 are to be utilized.

The number of the trusted ports 301 and untrusted ports 303 may vary per the desires of the user. In one embodiment, the trusted ports 301 may be excluded in favor of the untrusted ports 303.

It should be noted that the network adapter 300 may include any Peripheral Component Interconnect (PCI) card, Industry Standard Architecture (ISA) card, Integrated Services Digital Network (ISDN) adapter, cable modem adapter, broadband adapter, or any other type of adapter capable of being installed on any sort of housing associated with a desktop, laptop or any other type of computer. In the alternative, the network adapter 300 may be integrally formed with the computer. Of course, the network adapter 300 may comprise any sort of interface between the network and the computer.

Figure 3B:
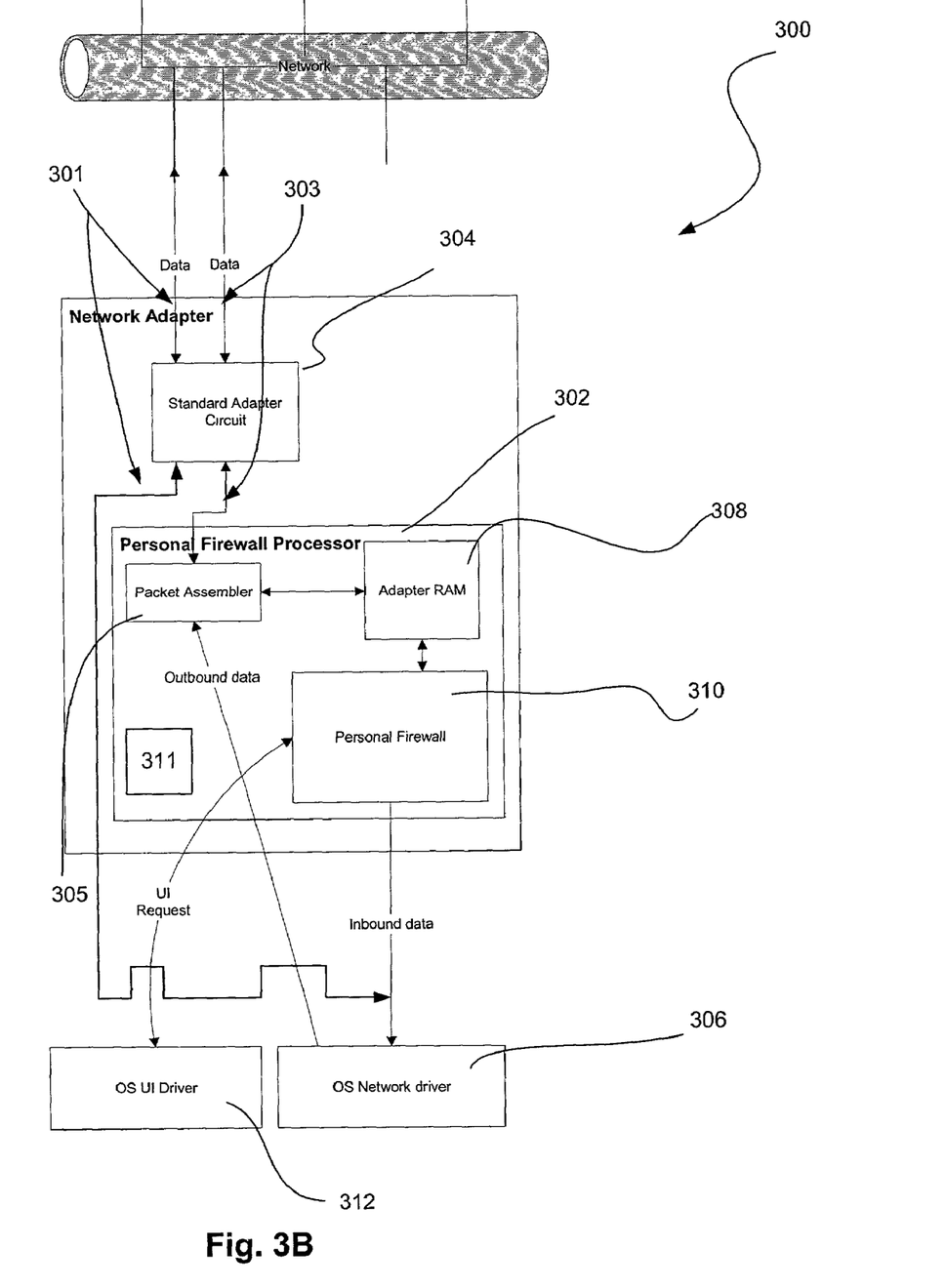
FIG. 3B is a schematic diagram of the network adapter with firewall capabilities, in accordance with one embodiment.

FIG. 3B is a schematic diagram of the network adapter 300 with firewall capabilities, in accordance with one embodiment. As shown in FIG. 3B, the network adapter 300 includes a processor 302 in communication with a standard adapter circuit 304. The processor 302 is coupled to the computer, while the standard adapter circuit 304 is coupled to the network. It should be noted that this configuration may vary per the desires of the user. For example, the standard adapter circuit 304 may be coupled to the computer, while the processor 302 is coupled to the network.

Such standard adapter circuit 304 may include various voltage regulating circuits, a bus, light emitting diode connections, and/or any other conventional circuitry commonly implemented in a network adapter 300. The processor 302 of the network adapter 300 may include a single semiconductor platform or multiple interconnected semiconductor platforms with associated logic to accomplish the functionality set forth herein.

The processor 302 of the network adapter 300 may include a packet assembler module 305 coupled to the standard adapter circuit 304 for assembling packets received from the network and packetizing information received from the computer. It should be noted that the processor 302 of the network adapter 300 is in communication with an operating system network driver 306 associated with the computer for receiving outbound data therefrom and further conditionally sending inbound data thereto, in a manner that will be set forth in greater detail during reference to FIG. 4.

Also included is adapter random access memory 308 coupled to the packet assembler module 305 for storing packets received therefrom. It should be noted that the memory 308 may include any cache or fast memory capable of allowing quick storage and/or retrieval of data.

Still yet, the processor 302 of the network adapter 300 includes a firewall module 310. The firewall module 310 may include logic that protects the computer from attacks, etc. from other untrusted networks, or from applications making untrusted use of the network from the computer. In use, the firewall module 310 may operate to screen packets and conditionally deny transmission based on predetermined rules. Such rules may include any settings, criteria, etc. capable of preventing transmission of packets that are unwanted, unauthorized, etc.

For example, the firewall module 310 may be used to prevent others from accessing the computer. This may or may not be accomplished by examining each incoming packet to determine whether it should be forwarded based on a predetermined settings.

Firewall module 310 functionality may include, but is not limited to screening packets to make sure they come from acceptable (previously identified) domain name, Internet ports, and Internet Protocol (IP) addresses. Further, the firewall module 310 may only allow remote access to the computer by the use of secure logon procedures and authentication certificates.

Optionally, various settings and other related control information associated with the firewall module 310 may be stored on a non-volatile solid state memory (i.e. FLASH RAM). This may be user protected by configuring the network adapter 300 BIOS with a password that only a user can change, as will soon become apparent.

As an option, a control module 311 may be used to control the overall operation of the network adapter 300. It should be noted, however, that the overall operation may be controlled in any desired manner. For example, the processor 302 may be controlled at least in part by way of the computer or a remote administrator communicating via the network.

A user interface driver 312 is coupled to the firewall module 310 for facilitating the configuration of the firewall module 310 and various other aspects of the network adapter 300. More information on such configurability will be set forth in greater detail during reference to FIG. 5.

In use, the packets received via the trusted ports 303 bypass the processor 302, while packets received via the untrusted ports 303 are managed by the processor 302 in the manner that will now be set forth.

Figure 4:
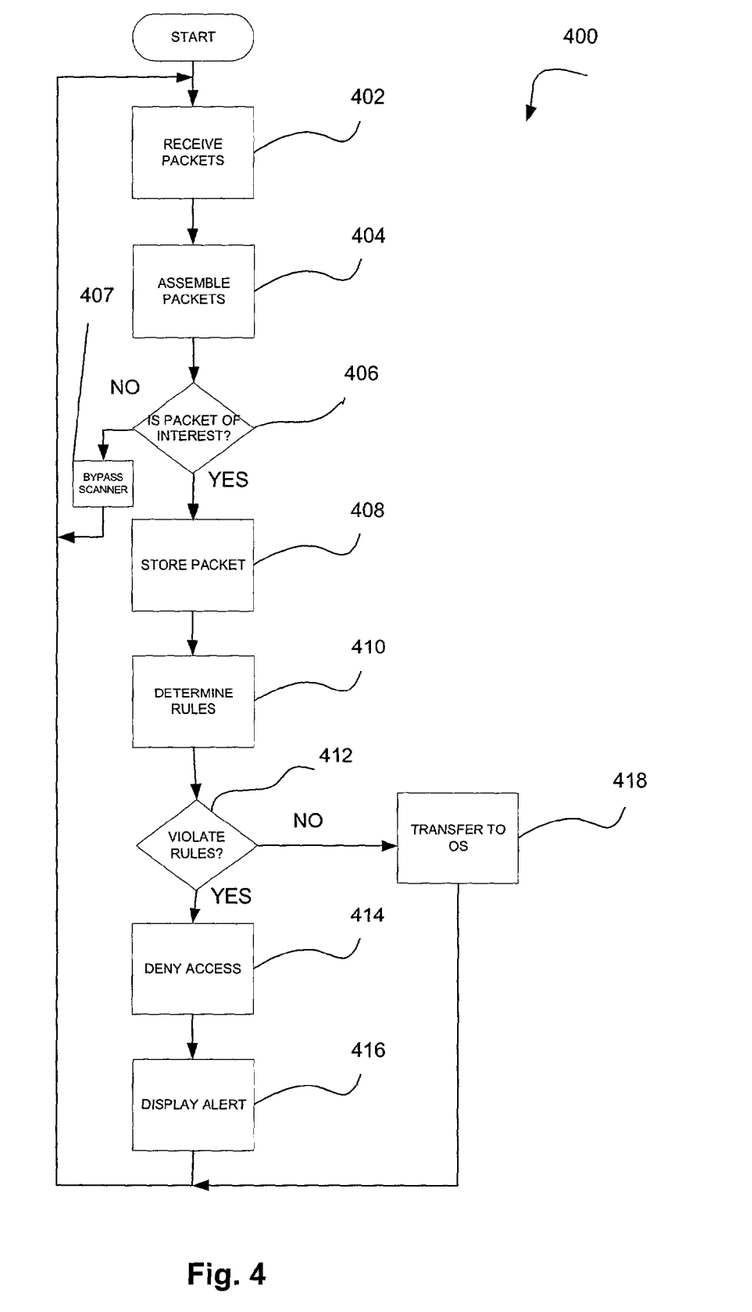
FIG. 4 illustrates a method for screening incoming data utilizing a network adapter with firewall capabilities.

FIG. 4 illustrates a method 400 for screening incoming data utilizing a network adapter with firewall capabilities. In one embodiment, the present method 400 may be used in the context of a network adapter like that mentioned hereinabove during reference the previous figure. Of course, the present techniques may be utilized in any desired context.

Initially, packets are received in operation 402 from the network. As mentioned earlier, this may be accomplished directly or through a standard adapter circuit 304, or by any other conduit. Thereafter, the packets are assembled in operation 404. This may be accomplished in any feasible method. For example, the packet assembler module 305 may utilize header information associated with the packets for assembling the data fields of the packets.

As each packet arrives, it is determined whether the packets are of interest. Note decision 406. Such determination may be based on any desired factor such as a source of the packet, a protocol associated with the packet, a timing of the packet, contents of the packet, and/or any other desired factor. In any embodiment where certain protocols are of interest, a predetermined amount of packets may need to be assembled to first identify whether the packets are of interest.

Table #1 illustrates an exemplary list of protocols that may be of interest. It should be noted that such list may vary based on a security threat that data using a particular protocol pose.

TABLE 1

HTTP traffic
FTP traffic
All Novell NetWare protocol traffic
All Windows protocol traffic If the packets are not of interest, as decided in decision 406, the packets are bypassed directly to the computer. See operation 407. This may be accomplished by bypassing the firewall module 310 and memory 308, and communicating directly with the network driver 306 of the computer. By this design, the packets that are not to be screened are communicated with the computer as fast as possible.

If, on the other hand, the packets are of interest, as decided in decision 406, the packets are cached in operation 408. For example, they may be stored in the memory 308. The current rules are then determined in operation 410. As mentioned earlier, the rules may include, but are not limited to any settings, criteria, etc. capable of preventing transmission of packets that are unwanted, unauthorized, etc. As an option, the rules may be user-configurable in a manner that will be set forth in greater detail hereinafter.

Once the rules are determined, it may be determined decision 412 as whether the packets violate such rules. If no violation occurs, the packets are transferred to the computer (i.e. network driver 306). See operation 418. If, however, the packet fails to comply with the current rule set, as determined by decision 412, access may be denied to the computer in operation 424. This way, no unauthorized packets and/or files reach the computer.

Further, an alert may be displayed for notifying a user of the denial of access. As an option, such alert may also provide options as to remedies for the situation. Such alert may be conveyed in any desired manner. For example, the alert may be provided to a remote administrator, using an indicator on the network adapter, and/or an interface on the computer. To accomplish this, such alert may be sent to the user interface driver 312.

To this end, the firewall capabilities are ensured and accelerated through use of the hardware processor. Further, by the critical positioning of the hardware processor on the network adapter, protection is inherently provided whenever network access is gained.

Figure 5:
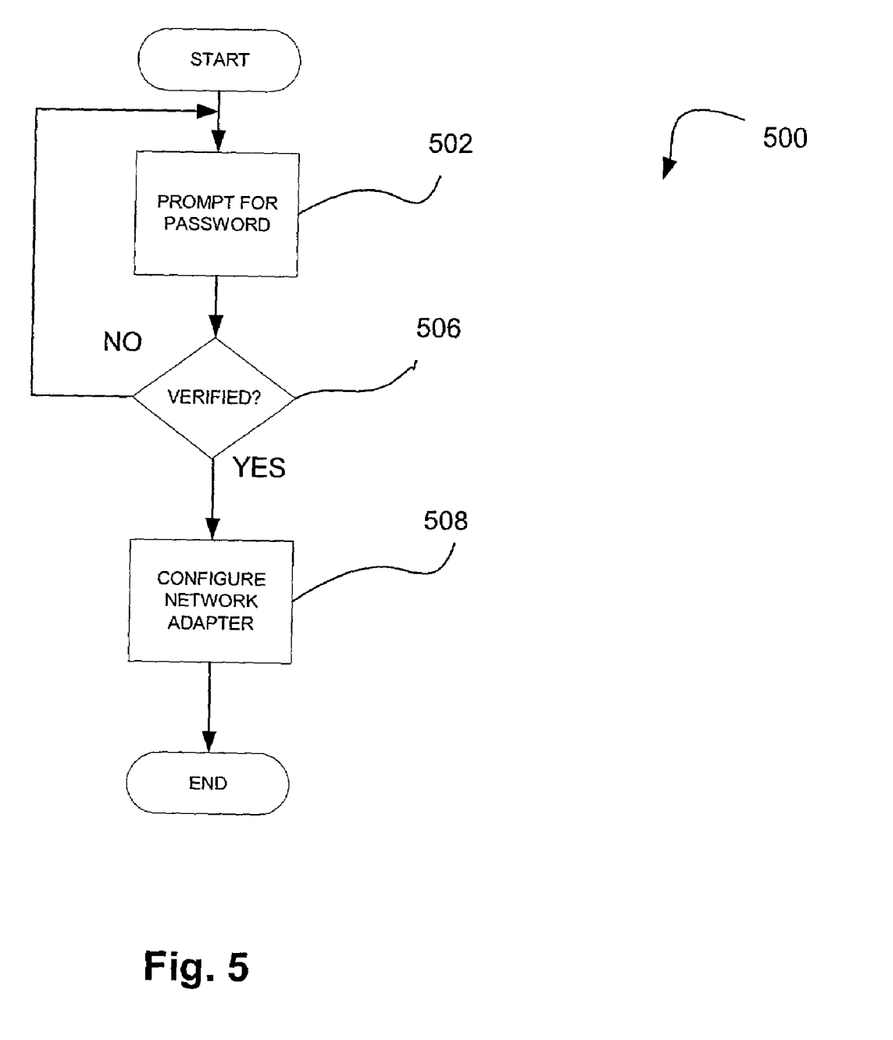
FIG. 5 illustrates a method for configuring a network adapter with firewall capabilities, in accordance with one embodiment.

FIG. 5 illustrates a method 500 for configuring a network adapter with firewall capabilities, in accordance with one embodiment. Again, the present method 500 may be used in the context of a network adapter and associated method like that mentioned hereinabove during reference to the previous figures. Of course, the present techniques may be utilized in any desired context.

Initially, a computer user or remote administrator may be prompted for a password in operation 502. In the case of the user of the computer being prompted, this may be accomplished utilizing the user interface driver 312 of FIG. 3B. On the other hand, in the case of the remote administrator, the password request may be prompted using TCP/IP or any other desired network protocol. In the case of TCP/IP, the network adapter 300 may be assigned a dedicated IP address or MAC address for identification purposes.

If the password is received and verified, it is then determined whether the user or remote administrator wishes to update the rules associated with the firewall 310 of the processor 302. If the rules are to be changed, a user may alter various network adapter 300 settings in operation 514. These settings may range from conventional settings to determining which packets and files are of interest and further the specific rule base to be used in the context of the method 400 of FIG. 4. Just by way of example, the user may configure the packet filtering to enable/disable packet assembling and screening of HTTP traffic. Further, various other heuristics, well known firewall settings, or the like may also be configured. More information regarding the configuration of rules will be set forth during reference to FIG. 6.

As an option, since the memory 308 may have a limited amount of capacity with which to store assembled packets, the user may be able to set a threshold for the maximum size of packets to be stored in memory, As a further option, direct memory access may be used to utilize desktop RAM.

Figure 6:
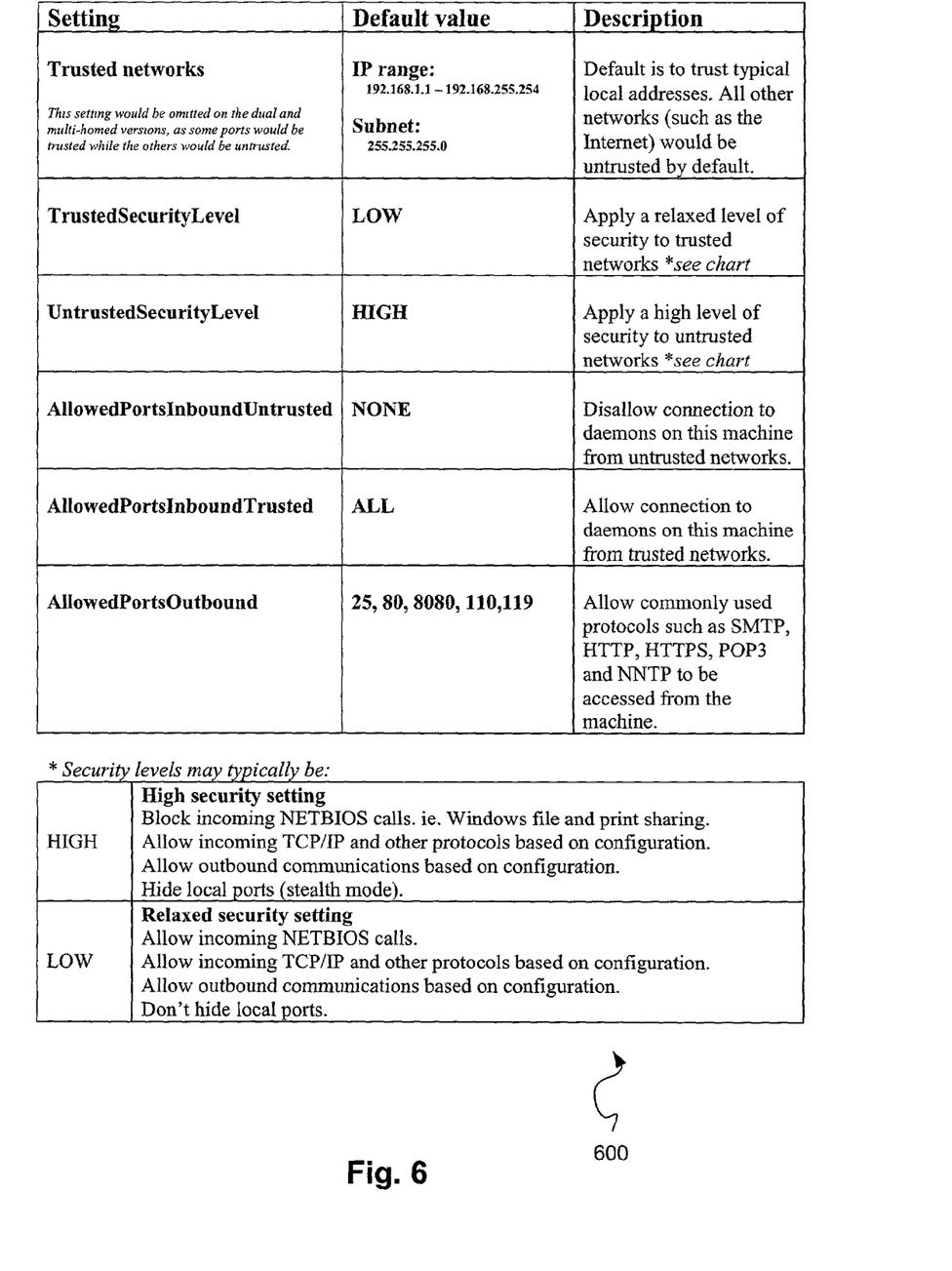
FIG. 6 illustrates an exemplary set of rules that may be selected by a user during the configuration method of FIG. 5, or in any other desired manner.

FIG. 6 illustrates an exemplary set of rules 600 that may be selected by a user during the configuration method 500 of FIG. 5, or in any other desired manner. It should be noted that the network adapter may be shipped with a default configuration for a typical user. Settings may vary for network adapters shipped for use in servers.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A network adapter, comprising:
    a plurality of designated trusted and untrusted ports; and
    a processor provisioned in the network adapter, configured for providing firewall capabilities, and coupled within a computer, the network adapter coupled to a network via the ports, wherein network traffic from the trusted ports bypasses the processor, wherein the network adapter processor is configured for:
        assembling the network traffic into packets, wherein a subset of the packets greater than a threshold for a maximum size of packets are stored in random access memory of the computer;
        performing an initial determination whether certain assembled incoming packets are of interest for screening activities based on, at least, determining a source of the certain assembled incoming packets, a protocol of the certain assembled incoming packets, a timing of the certain assembled incoming packets and content within the certain assembled incoming packets;
        determining whether the certain assembled incoming packets of interest violate a plurality of predetermined rules for packet transmissions;
        denying access to certain areas of the computer based on a violation of the predetermined rules, wherein the violation is associated with remote access to the computer using an authentication certificate;
        granting access to the certain areas of the computer if no violation occurs; and
        communicating an alert that signals the violation, wherein the alert is provided using an indicator on the network adapter and the alert includes a plurality of options for addressing the violation.

2. The network adapter as recited in claim 1, wherein the processor is capable of being user-configured locally.

3. The network adapter as recited in claim 1, wherein the ports include physical ports coupled to the network adapter for receiving plugs therein.

4. The network adapter as recited in claim 3, wherein the trusted ports are visually differentiated from the untrusted ports.

5. The network adapter as recited in claim 4, wherein the trusted ports are visually differentiated from the untrusted ports utilizing color.

6. The network adapter as recited in claim 1, wherein the ports are electronic ports.

7. The network adapter as recited in claim 1, wherein received packets are of interest based on an associated protocol.

8. The network adapter as recited in claim 1, wherein the processor is capable of passing received packets that are not of interest.

9. The network adapter as recited in claim 1, wherein the network adapter includes at least one of: a Peripheral Component Interconnect (PCI) card, an Industry Standard Architecture (ISA) card, an Integrated Services Digital Network (ISDN) adapter, a cable modem adapter, and a broadband adapter.

10. The network adapter as recited in claim 1, wherein the network adapter includes an adapter circuit that is coupled to the network.

11. The network adapter as recited in claim 10, wherein the adapter circuit is coupled to the computer.

12. The network adapter as recited in claim 1, wherein non-volatile solid state memory is protected by configuring a bios of the network adapter with a password.

13. The network adapter as recited in claim 1, further comprising:
    a packet assembler module configured to utilize header information associated with packets for assembling data fields of received packets.

14. The network adapter as recited in claim 1, wherein, based on an associated protocol, a predetermined amount of received packets are assembled by a packet assembler module.

* * * * *